United States Patent [19]

Hamren

[11] Patent Number: 5,343,843
[45] Date of Patent: Sep. 6, 1994

[54] KNOCK CONTROL FOR HIGH SPEED ENGINE INCLUDING A KNOCK BURST ENVELOPE FOLLOWER

[75] Inventor: Glen C. Hamren, Greentown, Ind.

[73] Assignee: Delco Electronics Corporation, Kokomo, Ind.

[21] Appl. No.: 66,295

[22] Filed: May 24, 1993

[51] Int. Cl.$^5$ .............................................. F02P 5/14
[52] U.S. Cl. ...................................... 123/425; 123/417
[58] Field of Search ............... 123/425, 417, 435, 416; 364/431.08; 73/35

[56] References Cited

U.S. PATENT DOCUMENTS

| | | | |
|---|---|---|---|
| 4,111,035 | 9/1978 | West et al. | 73/35 |
| 4,276,861 | 7/1981 | Kearney et al. | 123/425 |
| 4,644,918 | 2/1987 | McDermott | 123/425 |
| 5,090,382 | 2/1992 | Bolander et al. | 123/425 |
| 5,144,927 | 9/1992 | Denz | 123/425 |
| 5,144,928 | 9/1992 | Komurasaki | 123/425 |
| 5,144,929 | 9/1992 | Hosoya et al. | 123/425 |
| 5,186,146 | 2/1993 | Sohma et al. | 123/435 |
| 5,190,011 | 3/1993 | Hashimoto et al. | 123/435 |
| 5,222,481 | 6/1993 | Morikawa | 123/435 |

*Primary Examiner*—Raymond A. Nelli
*Attorney, Agent, or Firm*—Robert M. Sigler, Jr.; Mark A. Navarre

[57] ABSTRACT

An ignition system for a vehicle engine has a fast response knock control which generates a rectified knock sensor signal having peaks at a knock frequency in accordance with the knock induced engine vibrations and samples and holds the voltage at each consecutive peak to generate a knock burst envelope signal in which knock burst envelopes correspond in amplitude and duration to knock vibration bursts in the knock sensor signal without phase shift induced group delay. The fast response is preserved in a fast response DC noise reference and an output which provides pulses at a frequency increasing with amplitude of the knock burst envelopes.

11 Claims, 4 Drawing Sheets

5,343,843

KNOCK CONTROL FOR HIGH SPEED ENGINE INCLUDING A KNOCK BURST ENVELOPE FOLLOWER

BACKGROUND OF THE INVENTION

There has been a trend in the U.S. automotive industry toward high performance, high RPM engines which, to achieve maximum performance and efficiency, are operated in the near borderline knock region. Unfortunately, knock detection is more difficult in the noisier environment of an engine at high RPM; and knock control apparatus with noise reduction circuitry designed for lower RPM engines, which can contain envelope detecting analog low pass filters and analog integrators, may introduce phase and group delays which make consistent and accurate knock detection at high RPM difficult.

SUMMARY OF THE INVENTION

It is an object of this invention to provide an engine ignition timing system with knock control better suited for engine operation at high engine speed.

It is more particularly an object of this invention to reduce or eliminate phase or group delay due to analog low pass filters in a knock signal processing circuit.

These and other objects are realized in an ignition system for a vehicle comprising knock sensor means responsive to knock induced engine vibrations for generating a knock sensor signal having peaks in accordance with the knock induced engine vibrations, trigger apparatus responsive to each consecutive peak of the rectified knock sensor signal at the knock frequency for generating a trigger signal, sample and hold apparatus responsive to each consecutive trigger signal to sample and hold each successive peak amplitude of the rectified knock sensor signal and thereby generate a knock burst envelope signal in which knock burst envelopes correspond in amplitude and duration to knock vibration bursts in the knock sensor signal without phase shift induced delays and output circuit means responsive to the amplitude and duration of the knock burst envelopes in the knock burst envelope signal for deriving ignition timing for the engine, whereby knock control is enabled at high engine speed. Further details and advantages of the invention will be apparent from the accompanying drawings and following description of a preferred embodiment.

DESCRIPTION OF A PREFERRED EMBODIMENT

Figure 1:
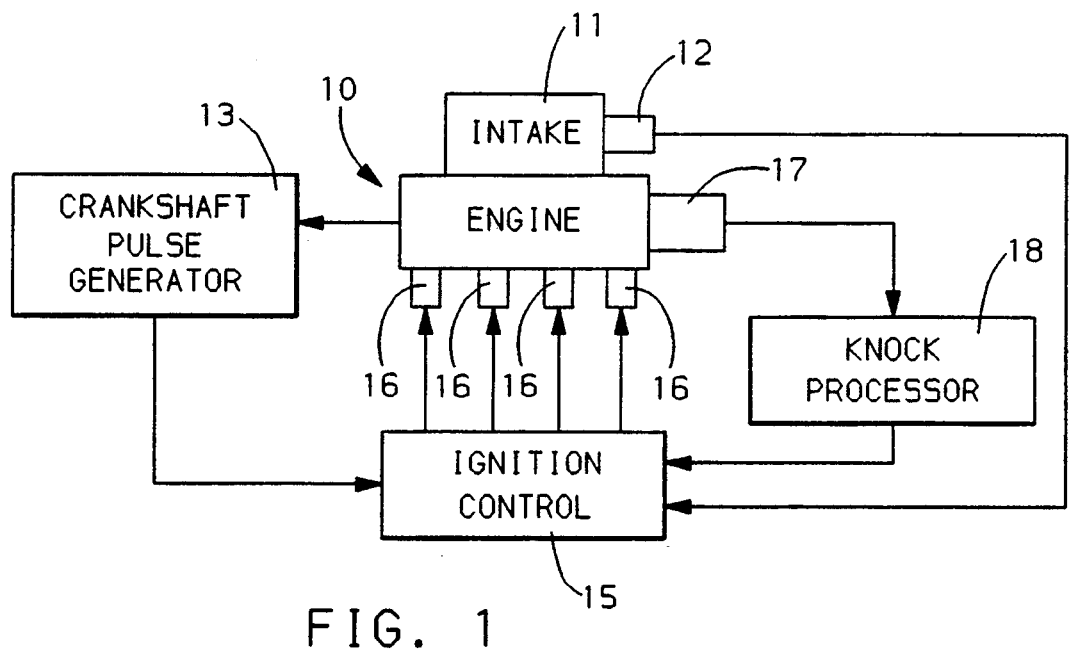
FIG. 1 is a block diagram of a vehicle engine having an ignition system according to the invention.

Referring to FIG. 1, a vehicle engine 10 includes fuel intake apparatus 11 having an engine load sensor 12. Engine 10 is a multi-cylinder, internal combustion, spark ignited engine. Fuel intake apparatus 11 may be a carburetor or fuel injection apparatus for providing air/fuel charges to the combustion chambers of engine 10. Engine load sensor 12 may be responsive to engine vacuum or manifold absolute pressure to provide an analog voltage comprising the engine load signal. Engine 10 further comprises a crankshaft pulse generator 13 for providing a train of pulses from which crankshaft rotational speed and position signals may be derived in a well known manner. The engine load signal from sensor 12 and the train of crankshaft reference pulses from pulse generator 13 are provided to an ignition control 15 which provides ignition firing pulses to spark plugs 16 of engine 10 at predetermined crankshaft angular positions according to a well known ignition timing algorithm.

Engine 10 further comprises a knock sensor 17, which may be an engine component mounted vibration sensor and which provides a raw knock signal to a knock processor 18. Sensor 17 may be responsive to the mechanical vibrations of an engine component subject to the knock induced ringing vibrations in the combustion chambers or, in the case of a combustion pressure sensor, responsive to the vibrations of the combustion gases themselves. In either case, sensor 17 may also be responsive to other vibrations not induced by knock and thus considered noise. Knock processor 18 includes noise reduction and other signal processing apparatus for deriving a knock control signal from the raw knock signal and providing it to ignition control 15 to retard the ignition timing as required to reduce or eliminate the knock sensed by knock sensor 17. Elements 12-18 in combination comprise an ignition system for engine 10.

Figure 2:
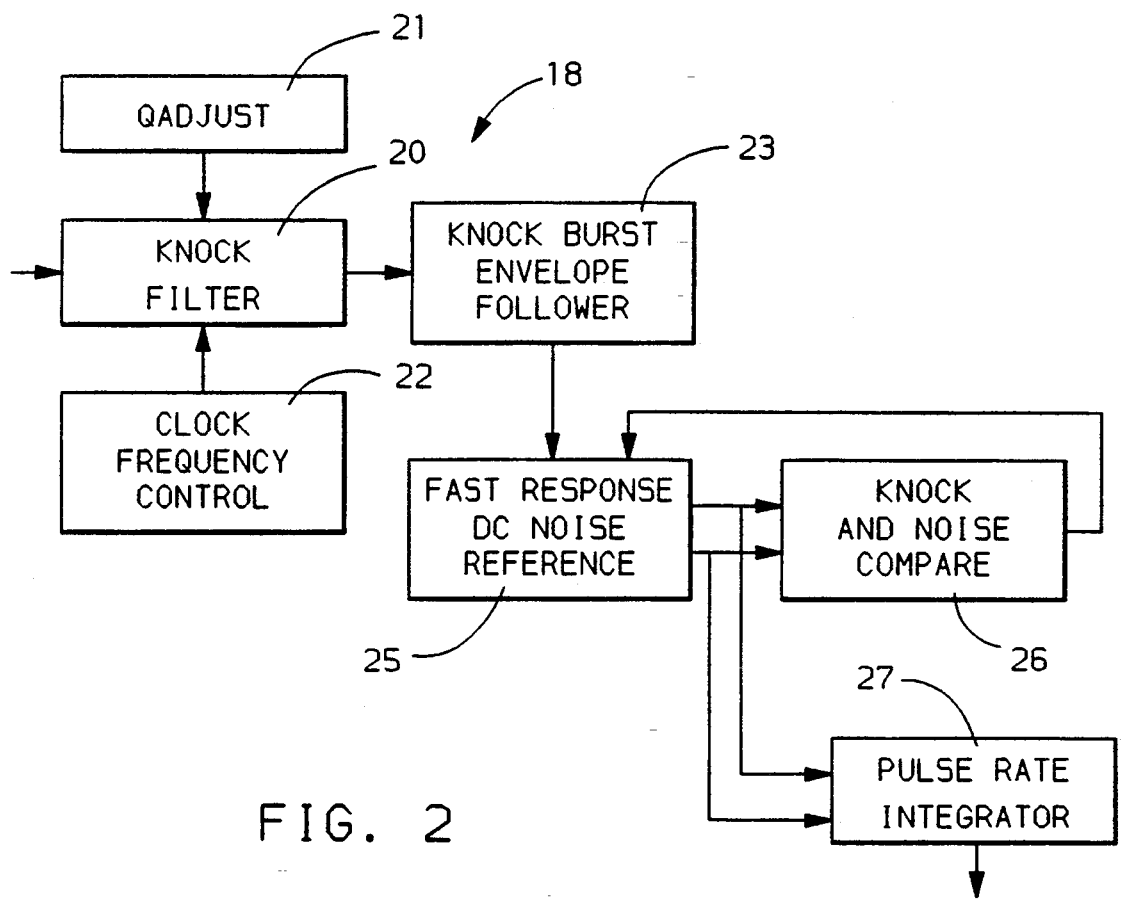
FIG. 2 is a block diagram of a knock processor for use in the ignition system of FIG. 1.

Knock processor 18 is shown in block diagram form in FIG. 2. The raw knock signal from knock sensor 17 is input to a knock filter 20, such as a switched capacitor bandpass filter, which may be provided with a Q adjust apparatus 21 and a clock frequency control 22. Knock filter 20 and its accompanying control apparatus provide bandpass filtering with controlled center frequency and Q which may be tuned to cleanly pass bursts of vibration signals at a characteristic knock frequency, for example, 6 Khz. The output of knock filter 20 is provided to a knock burst envelope follower 23, which derives an envelope signal from each sensed and filtered burst of vibrations, which may result from knock or noise. The envelope signal is passed to a fast response DC noise reference apparatus 25, in which an adaptive noise reference is created; and the envelope signal and noise reference are provided to a knock and noise compare apparatus 26. The output of knock and noise compare apparatus 26 is integrated in a pulse rate integrator 27, the output of which is the knock control signal provided to ignition control 15.

Figure 3:
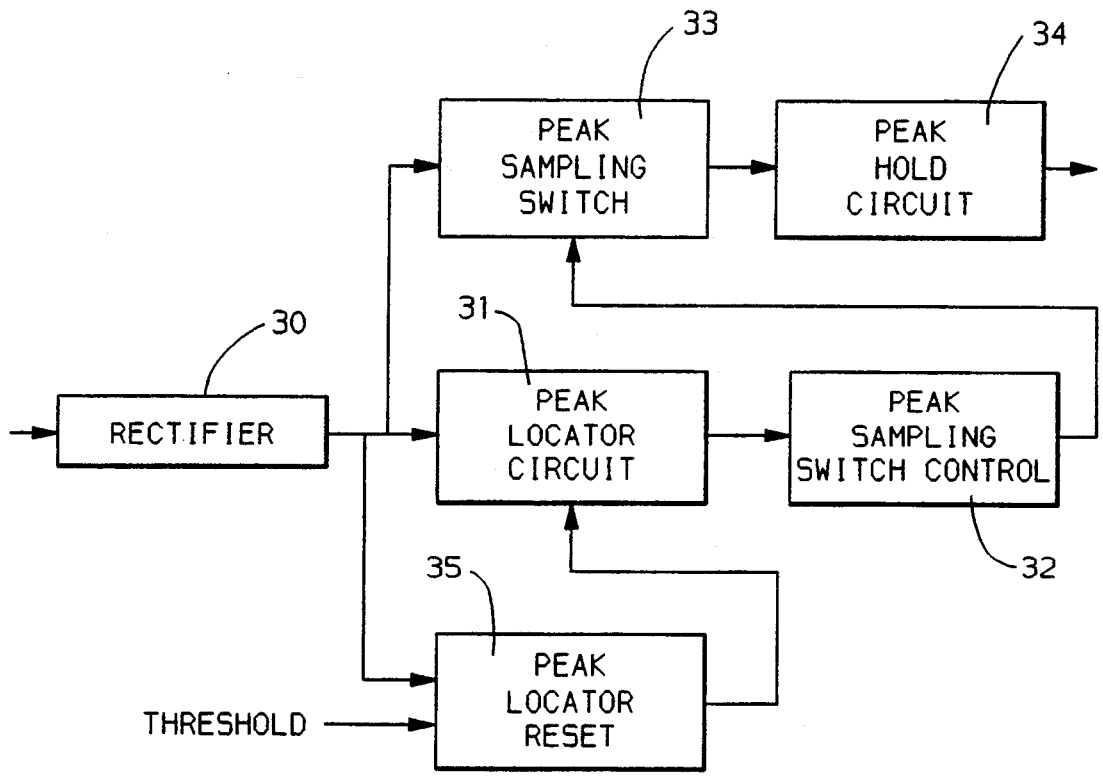
FIG. 3 is a block diagram of a knock burst envelope follower for use in the knock processor of FIG. 2.
Figure 5:
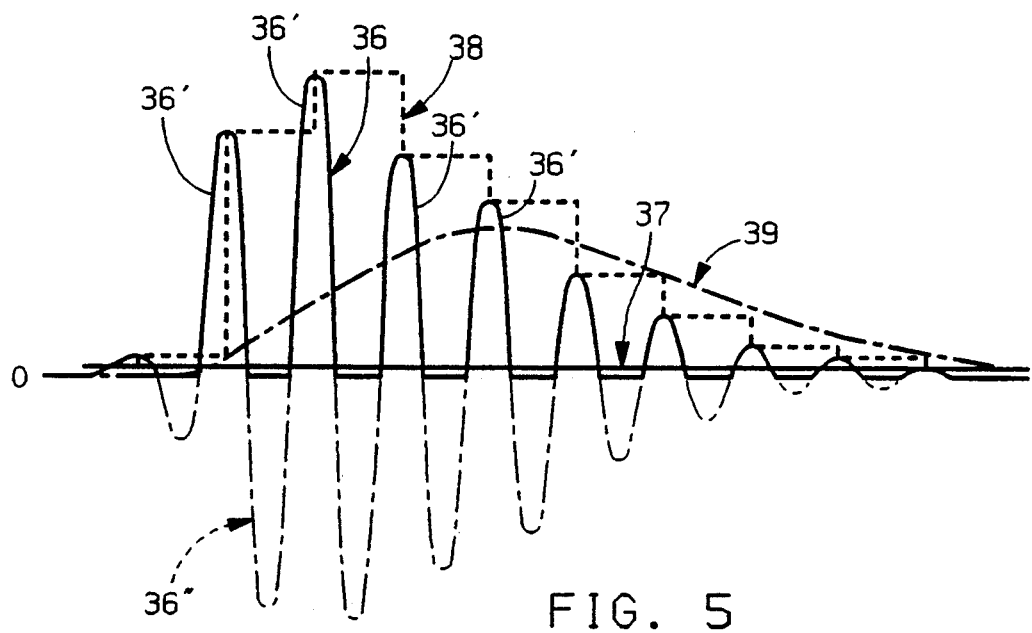
FIG. 5 is a waveform diagram useful in illustrating the operation of the circuit of FIG. 4.

Knock burst envelope follower 23 is shown in block diagram form in FIG. 3. The signal from knock filter 20 is input to a rectifier 30. The rectified knock sensor signal voltage output from rectifier 30 is shown as waveform 36 of FIG. 5. Each knock burst of waveform 36 comprises a series of pulses 36' that exceed a threshold 37 by varying amounts. FIG. 5 also shows the negative pulses 36'' which are suppressed by the rectifying action of the circuit.

The rectified knock sensor signal from rectifier 30 is provided to a peak locator circuit 31, which identifies the peak of each of pulses 36' and signals a peak sampling switch control 32 to briefly close a peak sampling switch 33, connected between rectifier 30 and a peak hold circuit 34. The brief closing of peak sampling switch 33 sets the output of peak hold circuit 34 to the output voltage of rectifier 30 at the peak thereof; and peak hold circuit 34 thereafter holds this peak value of the pulse 36' until the peak of the next one of pulses 36' is detected. The output of rectifier 30 is further provided to a peak locator reset apparatus 35, which is also provided with a threshold voltage corresponding to threshold 37 in FIG. 5. When the output of rectifier 30 falls below this threshold, it resets peak locator circuit 31 to initialize the circuit for the next one of pulses 36'.

The output of peak hold circuit 34, as seen in waveform 38 of FIG. 5, is thus a series of horizontal segments at the level of the peak of each of pulses 36' extending to the peak of the next of pulses 36' FIG. 5 also shows waveform 39, which is the corresponding output of a low pass filter provided with the same rectified knock signal and designed to provide an envelope waveform of the 6 KHz knock burst. It can be seen that this waveform is somewhat delayed in rising to its maximum height, and therefore in enclosing a significant area corresponding to the energy of the knock burst, as compared with the output of knock burst envelope follower 23. The latter is not encumbered with the group delay of a reactive low pass filter but responds to the peaks of the knock burst itself. This enables knock to be sensed more quickly and thus allows the circuit to be used for knock detection at higher engine speeds, especially for individual cylinder knock sensing and/or control.

Figure 4:
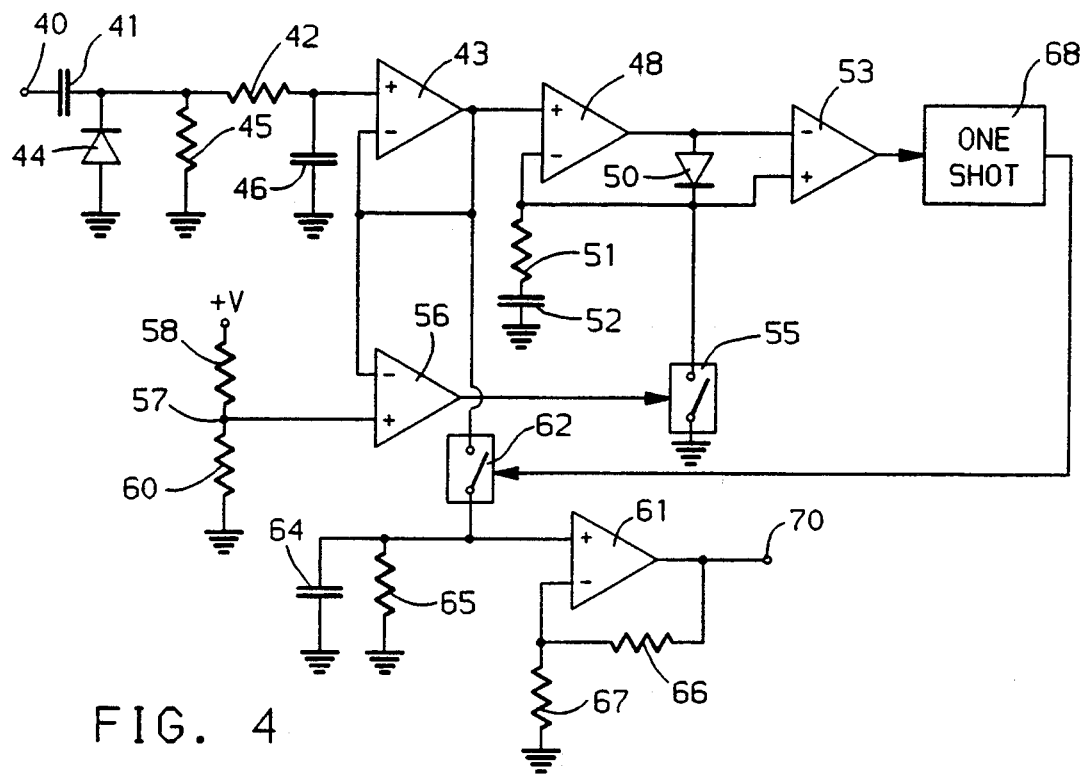
FIG. 4 is a circuit diagram of a preferred embodiment of the knock burst envelope follower of FIG. 3.

A preferred circuit embodiment for knock burst envelope follower 23 is shown in FIG. 4. The active electronic components are powered from a power supply +V providing, for example, a regulated +8 volts DC. An input terminal 40 is connected through a DC blocking capacitor 41 (0.033 $\mu$F) and a resistor 42 (5.1K) to the non-inverting input of an op amp 43 (3260). The junction of capacitor 41 and resistor 42 is connected through a diode 44 and resistor 45 (10K) in parallel to ground; and the non-inverting input of op amp 43 is connected through a capacitor 46 (0.001 $\mu$F) to ground. Diode 44 is oriented with its anode to ground so as to suppress the negative pulses 36'' of the input signal. Capacitor 46 and resistor 42 comprise a low pass filter to suppress noise at frequencies higher than the characteristic knock frequency, so as to smooth the signal for the following peak detector. This low pass filter has a half power frequency above 6 KHz and therefore introduces very little group delay in comparison with an envelope detecting low pass filter having a much lower half power frequency. The output of op amp 43 is connected to its inverting input for unity gain.

The output of op amp 43 is further connected to the non-inverting input of an op amp 48 (3260) having an output connected through a diode 50 to its inverting input, which inverting input is connected through a resistor 51 (510 ohm) and capacitor 52 (0.0039 $\mu$F) in series to ground. The output of op amp 48 is further connected to the inverting input of an op amp 53 (3260) having a non-inverting input connected to the inverting input of op amp 48 and cathode of diode 50 and through an analog switch 55 to ground. Analog switch 55 has a control electrode connected to the output of an op amp 56; and op amp 56 has an inverting input connected to the output of op amp 43 and a non-inverting input connected to the junction 57 of a series pair of resistors 58 (15K) and 60 (51 ohm) connected from power supply +V to ground. Analog switch 55, op amp 56 and resistors 58 and 60 essentially comprise peak locator reset 35.

An output op amp 61 (3260) has a non-inverting input connected through an analog switch 62 to the output of op amp 43 and through a capacitor 64 (0.01 $\mu$F) and resistor 65 (10M) in parallel to ground. The output of op amp 61 is connected to an output terminal 70 and also through a resistor 66 (1K) to its inverting input, which is connected through a resistor 67 (30K) to ground. Finally, the output of op amp 53 is connected to the trigger of a one shot 68 connected to the control electrode of analog switch 62. Peak sampling switch 33 essentially comprises analog switch 62; peak sampling switch control 32 essentially comprises one shot 68; and peak hold circuit 34 essentially comprises op amp 61, capacitor 64 and the associated resistors 65–67.

In operation, elements 41–46 DC isolate, rectify and smooth the knock signal to provide the rectified knock sensor signal voltage, as shown in waveform 36 of FIG. 5, at the output of op amp 43. This signal is provided to the peak locator circuit comprising op amps 48 and 53, diode 50, resistor 51 and capacitor 52. As the voltage on the non-inverting input of op amp 48 rises, capacitor 52 is charged through diode 50, with the voltage thereon being maintained equal to the rectified knock sensor signal voltage and one diode drop lower than the output of op amp 48. Diode 50 also maintains the voltage on the inverting input of op amp 53 one diode drop above the non-inverting input thereof to ensure a negative output. As the voltage on the non-inverting input of op amp 48 peaks and starts downward, capacitor 52 has no significant immediate discharge path and thus maintains its peak voltage. Diode 50 thus becomes reverse biased; and op amp 48 acts as a comparator switching to a low output voltage. The following op amp 53 thus undergoes an output voltage polarity reversal to a positive voltage, which triggers one shot 68 to provide a brief output pulse to analog switch 62. This pulse briefly closes switch 62, through which capacitor 64 quickly charges to the voltage at the output of op amp 43. After switch 62 opens, the voltage on capacitor 64 is then held, with op amp 61 providing an output voltage with a gain determined by resistors 66 and 67.

The threshold voltage, just slightly higher than ground, is generated at junction 57 of the voltage divider comprising resistors 58 and 60 and applied to the non-inverting input of op amp 56. Since the output of op amp 43 is applied to the inverting input of op amp 56, analog switch 55 will be closed only when the rectified knock sensor signal voltage at the output of op amp 43 falls below the threshold voltage. When this occurs, capacitor 52 is discharged to ground to reset the peak detector for the next one of pulses 36'. Thus the peak voltage of each consecutive one of pulses 36' is held until the next peak.

Figure 6:
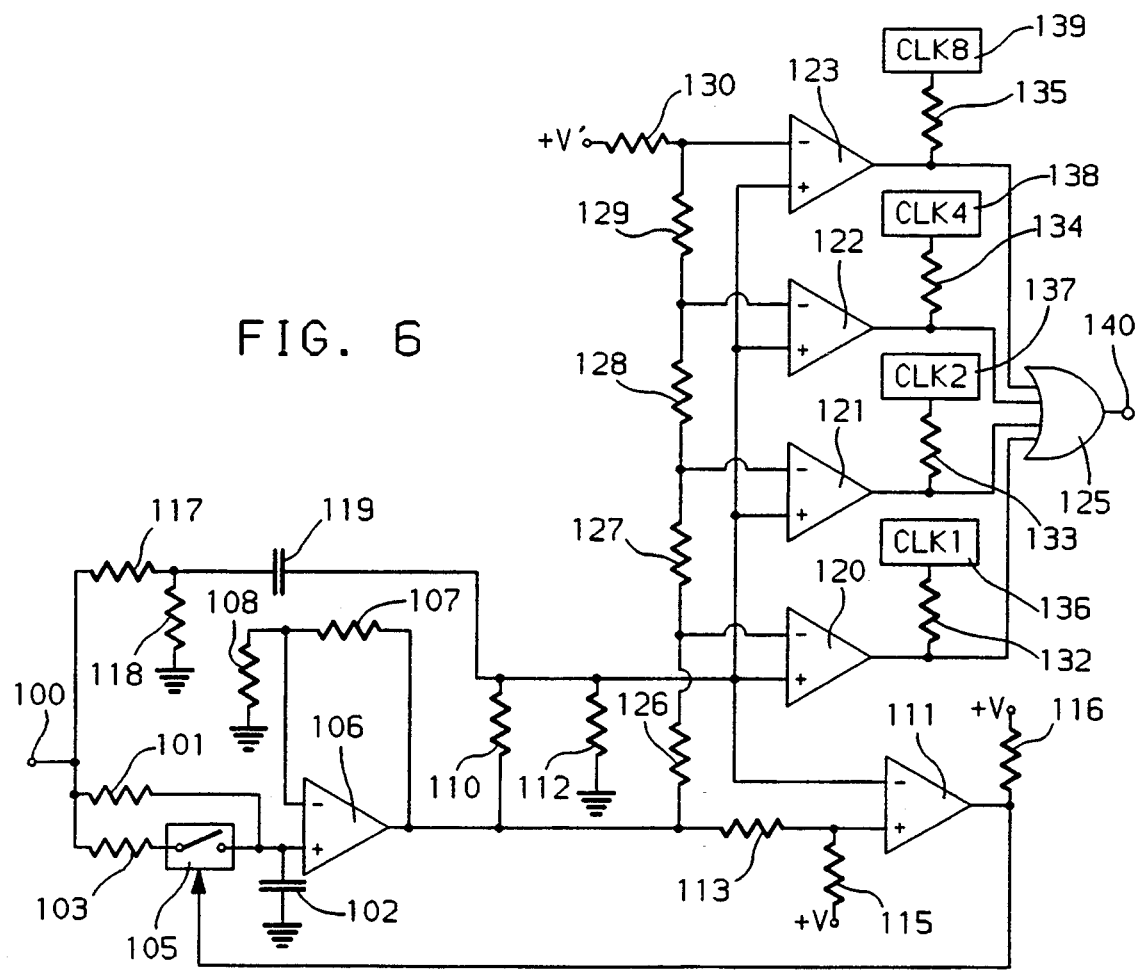
FIG. 6 is a circuit diagram of a first embodiment of a fast response DC noise reference and knock and noise compare apparatus for use in the knock processor of FIG. 2.

FIG. 6 shows a first embodiment of fast response DC noise reference 25 and knock and noise compare apparatus 26. Input terminal 100 receives the output of knock burst envelope follower 23 and is connected through a resistor 101 (2M), in parallel with the series combination of a resistor 103 (100K) and analog switch 105, to the non-inverting input of an op amp 106 (3260), which non-inverting input is also connected through a capacitor 102 (0.1 μF) to ground. Op amp 106 also has an inverting input connected through a resistor 107 (30K) to its output and through a resistor 108 (30K) to ground. The output of op amp 106 is connected through a resistor 110 (75K) to the inverting input of a comparator 111 (2903), which input has a resistor 112 (75K) connected to ground, and is further connected through a resistor 113 (200 ohm) to the non-inverting input of comparator 111, which input has a resistor 115 (30K) connected to voltage +V. The output of comparator 111 is connected through a pull-up resistor 116 (20K) to voltage +V and also to the control electrode of analog switch 105. Input 100 is further connected through a voltage divider comprising resistors 117 (3K) and 118 to ground; and the junction of resistors 117 and 118 is connected through a DC blocking capacitor 119 (0.47 μF) to the inverting input of comparator 111. Resistor 118 may be picked to adjust the AC gain of the signal in this path.

The circuitry described in the preceding paragraph comprises fast response DC noise reference 25. In operation, with analog switch 105 closed, the output of knock burst envelope follower 23 is applied to capacitor 102 through resistors 101 and 103 in parallel to provide an average DC noise level, which is then doubled by op amp 106. Resistors 110 and 112 divide this doubled DC noise level in half to provide the average DC noise level at the inverting input of comparator 111. The output of knock burst envelope follower 23 is AC coupled through capacitor 119 to the inverting input of comparator 111, where it is added to the average DC noise level to produce a noise ratiometric knock burst envelope signal. A voltage slightly higher than the doubled DC noise level from the output of op amp 106 is generated at the junction of resistors 113 and 115 and applied to the non-inverting input of comparator 111, which controls analog switch 105. Due to the normally higher voltage on its non-inverting input, switch 105 is normally closed to provide an effective resistance of 100K in the charge/discharge path of capacitor 102; and this permits the voltage on capacitor 102 to follow the average DC noise level of the incoming signal.

When the noise ratiometric knock burst envelope signal, which comprises the AC knock signal riding on the average DC noise level, applied to the inverting input of comparator 111 exceeds the approximately double average DC noise level on the non-inverting input thereof, however, switch 105 is opened, however, to remove resistor 103 from the circuit. The charge/discharge resistance of capacitor 102 is thus increased by a factor of 20; and this effectively holds the voltage on capacitor 102, and therefore on the output of op amp 106, to substantially reduce its response to the incoming signal. This occurs only when the AC component of the noise ratiometric knock burst envelope signal is substantially increased by knock; and it prevents this substantial knock component from distorting the average DC noise level reference.

The basic function of the fast response DC noise reference 25, as described above, is similar to apparatus described in U.S. Pat. No. 4,111,035 to West et al and U.S. Pat. No. 4,276,861 to Kearney et al. However, the circuit of FIG. 6 is DC isolated from the preceding circuit; and the AC portion of the knock burst envelope signal is first stripped from the incoming DC component and then recombined with the average DC noise level from capacitor 102 and op am 106. Thus, both the noise ratiometric knock burst envelope signal and the average DC noise signal provided to the following comparator are based on the same DC voltage, with all relative gains being determined ratiometrically within the circuit. This provides a reduction in the number of calibrations, and therefore the manufacturing cost, of the circuit.

Still referring to FIG. 6, the junction of resistors 110 and 112, at which appears the noise ratiometric knock burst envelope signal, is connected to the non-inverting inputs of op amps 120, 121, 122 and 123 (2901), each of which has an output connected to an input of an OR gate 125. The output of op amp 106 is connected through a voltage divider comprising resistors 126–130 in series to voltage +V', which may be a regulated +5 volts DC. The junctions of these resistors are connected to the inverting inputs of op amps 120–123, respectively: that is, the junction of resistors 126 and 127 is connected to op amp 120, the junction of resistors 127 and 128 is connected to op amp 121, and so forth. This voltage divider divides the voltage difference between the output of op amp 106 and voltage +V' and thus establishes a series of increasing voltages on the inverting inputs of op amps 120–123 which is ratiometric between twice the average DC noise level and the higher voltage +V'.

Figure 7:
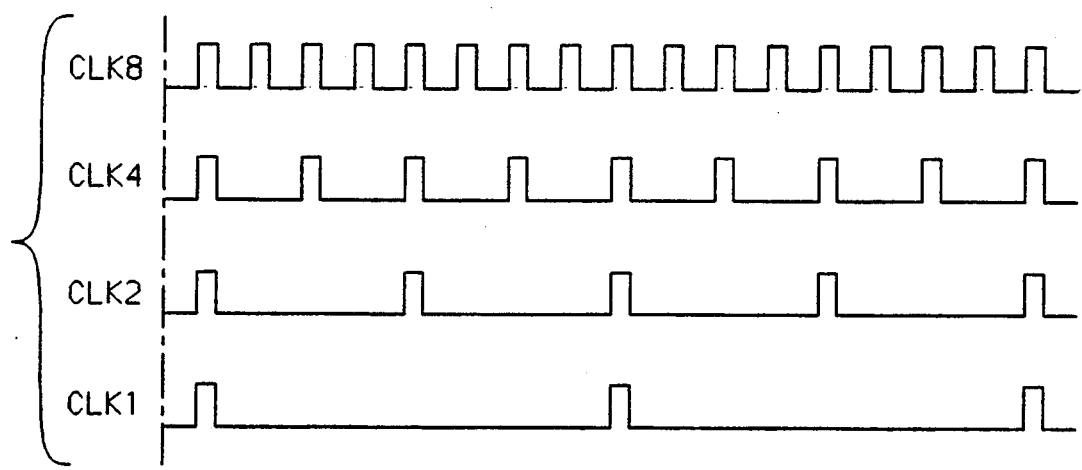
FIG. 7 is a waveform diagram useful in illustrating the operation of the circuit of FIG. 6.

The outputs of op amps 120–123 are connected, respectively, through resistors 132–135 (10K) to synchronized pulse generators 136–139 providing signals CLK1, CLK2, CLK4 and CLK8, respectively. Each of pulse generators 136–139 provides pulses at twice the frequency of the next lower numbered generator: that is, signal CLK8 is twice the frequency of signal CLK4, which is twice the frequency of signal CLK2, which is twice the frequency of signal CLK1. These signals are shown in FIG. 7. It can be seen that the signals are synchronized such that the pulses of the lower frequency signals occur simultaneously with those of higher frequency signals. Pulse generators 136–139 may thus comprise a single clock source for signal CLK8 which is divided down by consecutive factors of two for the other signals.

In operation, the noise ratiometric knock burst envelope signal is applied to the non-inverting inputs of each of op amps 120–123. Progressively higher reference voltages greater than twice the average DC noise level are applied to the inverting inputs of the same op amps. Thus, as the noise ratiometric knock burst envelope signal voltage increases above the reference voltage at the junction of resistors 126 and 127, op amp 120 couples signal CLK1 from pulse generator 136 to OR gate 125; and signal CLK1 appears on an output terminal 140 thereof. As the ratiometric knock burst envelope voltage further increases above the reference voltage on the junction of resistors 127 and 128, op amp 121 couples signal CLK2 from pulse generator 137 to OR gate 125; and this signal appears at output terminal 140 thereof at twice the frequency of signal CLK1. Since the pulses of signal CLK1 are simultaneous with every other pulse of signal CLK2, the output of OR gate 125 on terminal 140 is essentially signal CLK2. In a similar manner, signals CLK4 and CLK8 appear at output terminal 140 as the ratiometric knock burst envelope voltage exceeds the higher reference voltages established between resistors 128, 129 and 130. Thus, the greater is the amount by which the ratiometric knock burst envelope voltage exceeds twice the average DC noise level, the higher is the frequency of the output signal at terminal 140. This signal, when provided to an "integrating" pulse counter, will indicate the area under the knock burst envelopes, and thus the energy of the knock bursts, with minimal delay, as compared with an analog or digital integrator.

Figure 8:
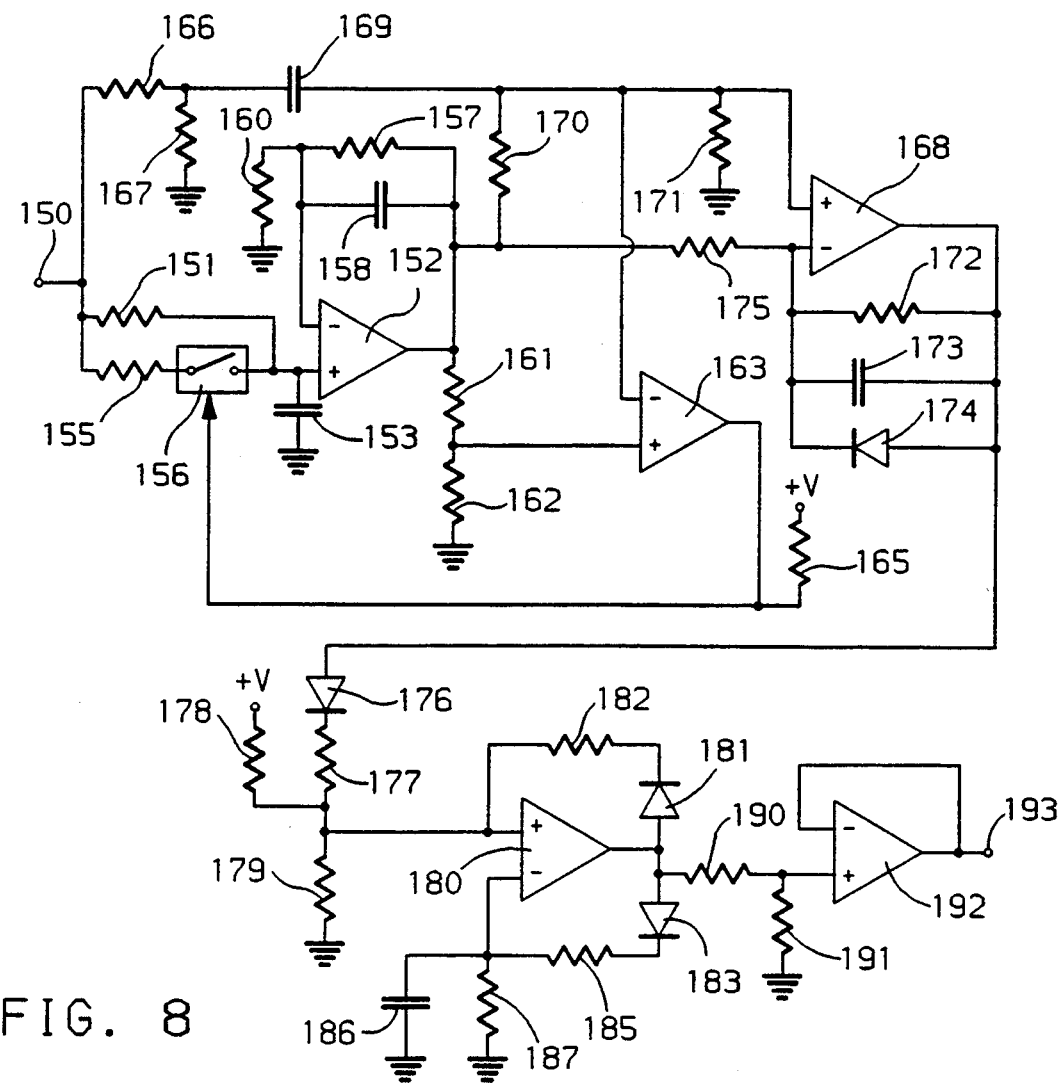
FIG. 8 is a circuit diagram of a second embodiment of a fast response DC noise reference and knock and noise compare apparatus for use in the knock processor of FIG. 2.

An alternative embodiment of fast response DC noise reference 25 and knock and noise comparator 26 is shown in FIG. 8. Input terminal 150 is connected through resistor 151 (2M) to the non-inverting input of op amp 152, which is connected through a capacitor 153 (0.1 μF) to ground. A resistor 155 (100K) and series analog switch 156 are connected in parallel with resistor 151. The inverting input of op amp 152 is connected through a resistor 157 (30K) and parallel capacitor 158 (0.001 μF) to the output thereof and also through a resistor 160 (30K) to ground. The output of op amp 152 is connected through resistors 161 (10K) and 162 (15K) in series to ground; and the junction of resistors 161 and 162 is connected to the non-inverting input of an comparator 163 (2903), which has an output connected through a pull-up resistor 165 (20K) to voltage +V and is further connected to the control electrode of switch 156. Input 150 is further connected through a voltage divider comprising resistors 166 (3K) and 167 in series to ground; and the junction of resistors 166 and 167 is connected through a DC blocking capacitor 169 (0.68 μF) to the non-inverting input of an op amp 168 (3260), which input is further connected to the inverting input of comparator 163, through a resistor 170 (100K) to the output of op amp 152, and through a resistor 171 (75K) to ground. The output of op amp 168 is connected through a feedback resistor 172 (10K), capacitor 173 (33 pF) and diode 174 in parallel to the inverting input thereof; and the output of op amp 152 is connected through a resistor 175 (10K) to the inverting input of op amp 168.

The portion of FIG. 8 described to this point is essentially similar to that of FIG. 6 in that it generates an average DC noise level voltage on capacitor 153, which is doubled in op amp 152, and the AC signal through capacitor 169 is recombined with a DC voltage level somewhat less than the average DC noise level at the junction of resistors 170 and 171. In addition, comparator 163 provides control of switch 156 similar to that of comparator 111 in the circuit of FIG. 6. The voltage applied to the non-inverting input of comparator 163 is lower, since the voltage divider comprising resistors 161 and 162 connects to ground rather than +V. However, the lower percentage of the average DC noise level applied to the non-inverting input of comparator 163 is matched to the lower percentage of the average DC noise level applied to the inverting input thereof from the junction of resistors 170 and 171. The circuits are similar in structure and essentially the same in function to this point.

Instead of providing an average DC noise level signal and a ratiometric knock burst envelope signal to a following comparator, however, this circuit provides these signals to a noise subtracting op amp 168. If the noise ratiometric knock burst envelope signal, which is the AC knock signal riding on a DC voltage 0.84 times the voltage on noise averaging capacitor 153 and applied to the non-inverting input of op amp 168, does not exceed the voltage applied to the inverting input of op amp 168, which is twice the voltage on capacitor 153, the output thereof is ground, since that is the lowest supply voltage. If the non-inverting input voltage does exceed the inverting input voltage, however, the output will equal twice the difference for differences less than one diode drop, due to the values of resistors 172 and 175. For greater differences, however, diode 174 will short out resistor 172, and the input difference will be reproduced at the output. This provides a boost for very small knock signals.

Still referring to FIG. 8, the output of op amp 168 is connected through a diode 176 and resistor 177 (6.2K) to the non-inverting input of an op amp 180 (3260), which input is also connected through a resistor 178 (1M) to supply +V and through a resistor 179 (20K) to ground. Op amp 180 further has an output connected through a diode 181 and resistor 182 (6.2K) in series back to the non-inverting input thereof and through a diode 183 and resistor 185 (1.1K) in series back to the inverting input thereof. The inverting input of op amp 180 is also connected through a capacitor 186 (750 pF) and resistor 187 (30K) in parallel to ground. The output of op amp 180 is connected through a voltage divider comprising series resistors 190 (12K) and 191 (20K) to ground, with the junction of resistors 190 and 191 connected to the non-inverting input of a voltage follower connected op amp 192 (3260), the output of which comprises an output terminal 193.

Elements 176–192 comprise a voltage controlled oscillator (VCO). Op amp 180 is connected as a comparator in a basically unstable circuit with capacitor 186. Assuming a discharged capacitor 186 and no current output from op amp 168, the application of power to the circuit provides a small voltage on the non-inverting input of op amp 180. This produces a high output voltage, which produces current through diode 183 and resistor 185 to charge capacitor 186. However, current also flows through diode 181 and resistors 182 and 179 to ground. The large resistance of resistor 178 essentially isolates the non-inverting input of op amp from the +V power supply; and the voltage thereon is therefore set essentially in accordance with the voltage divider effect of resistors 182 and 179. This voltage is about 5.6 volts; and capacitor 186 quickly charges to this voltage through the 1.1K resistor 185. When the voltage on capacitor 186 equals that on the non-inverting input of op amp 180, the output switches low; and current then stops flowing through diodes 181 and 183. The voltage on the non-inverting input of op amp 180 thus drops to just above ground, as determined by the voltage divider effect of resistors 178 and 179 across 8 volts; and capacitor 186 discharges through the 30K resistor 187 to the near ground voltage on the non-inverting input. The rate of discharge of capacitor 186 is close to 30 times slower than the rate of charge thereof; so the output of op amp 180, as provided through follower op amp 192, comprises short pulses of high voltage separated by much longer durations of ground voltage, with the voltage divider of resistors 190 and 191 decreasing the amplitude of the high voltage output.

As the output of op amp 168 increases, it is applied through diode 176 to increase the voltage applied across the series combination of resistors 177 and 179. This tends to increase the voltage on the non-inverting input of op amp 180 during both while the op amp output is high and when it is low; but the voltage when it is low is increased at a greater rate; and this tends to decrease the discharge time of capacitor 186 and thus increase the pulse frequency. As an example, a full 8 volt output from op amp 168 will increase the voltage on the non-inverting input of op amp 180 to approximately 6.4 volts when the op amp output is high but will increase it to 5.6 volts when the op amp output is low. It is the difference between these voltages which determines the charge/discharge cycle of capacitor 186 and thus the frequency of oscillation; and this voltage difference is only 0.8 volts with full output from op amp 168, as compared to about 5.6 volts when the output from op amp 168 is zero. As the difference between the noise ratiometric knock burst envelope signal and a multiple of the average DC noise level increases, therefore, the frequency of output pulses will increase by a factor of about 7 to the maximum knock signal; and this is close to the factor of 8 in the output of the circuit of FIG. 6.

The embodiments of the invention in which an exclusive property or privilege is claimed are defined as follows:

1. An ignition system for a vehicle engine of the type which may exhibit bursts of knock induced engine vibrations at a knock frequency, the apparatus comprising, in combination:
   knock sensor means responsive to the knock induced engine vibrations for generating a rectified knock sensor signal having peaks in accordance with the knock induced engine vibrations;
   trigger apparatus responsive to each consecutive peak of the rectified knock sensor signal at the knock frequency for generating a trigger signal;
   sample and hold apparatus responsive to each consecutive trigger signal to sample and hold each successive peak amplitude of the rectified knock sensor signal and thereby generate a knock burst envelope signal in which knock burst envelopes correspond in amplitude and duration to knock vibration bursts in the knock sensor signal without phase shift induced delays; and
   output circuit means responsive to the amplitude and duration of the knock burst envelopes in the knock burst envelope signal for deriving ignition timing for the engine, whereby knock control is enabled at high engine speed.

2. The ignition system of claim 1 wherein:
   the knock sensor means comprises a knock sensor generating a knock signal voltage comprising, in the presence of knock, alternating peaks of first and second polarity and a rectifier for suppressing peaks in the output signal of the first polarity to generate a rectified knock sensor signal voltage having only peaks of the second polarity;
   the trigger apparatus comprises a peak locator circuit having voltage memory means responsive after initialization to the rectified knock sensor signal voltage changing in a first direction to maintain a predetermined voltage difference therewith and effective with the rectified knock sensor signal voltage changing in the opposite direction to maintain a substantially constant voltage and thus lose the predetermined voltage difference;
   the trigger apparatus further comprises a peak sampling switch control responsive to a loss of the predetermined voltage difference by the voltage memory means to generate a sampling signal and a peak locator reset circuit responsive to a predetermined relationship between the rectified knock sensor signal voltage and a threshold to initialize the peak locator circuit; and
   the sample and hold apparatus comprises a peak hold circuit and a peak sampling switch connected between the rectifier and the peak hold circuit, the peak sampling switch being responsive to the sampling signal to briefly allow voltage communication therethrough.

3. The ignition system of claim 2 in which the peak locator circuit comprises:
   a first operational amplifier having a non-inverting input for receiving the rectified knock sensor signal voltage, an inverting input connected through a resistor to a capacitor and an output, the capacitor having a capacitor voltage comprising the memory means;
   a diode having an anode connected to the output of the first operational amplifier and a cathode connected to the inverting input of the first operational amplifier for charging the capacitor to maintain the predetermined voltage difference between the capacitor voltage and the rectified knock sensor voltage while the rectified knock sensor signal voltage is increasing but for preventing discharge of the capacitor to maintain the capacitor voltage substantially constant and thus reverse bias the diode while the rectified knock sensor signal voltage is decreasing; and
   a second operational amplifier having an inverting input connected to the cathode of the diode, a non-inverting input connected to the anode of the diode and an output responsive to the diode being reverse biased to provide the trigger signal.

4. The ignition system of claim 3 in which a one shot is responsive to the trigger signal to generate the sampling signal.

5. The ignition system of claim 3 in which the peak locator reset circuit comprises:
   a third operational amplifier having a first input for receiving the rectified knock sensor signal voltage, a second input connected to a threshold voltage reference and an output; and
   a capacitor discharge switch effective to discharge the capacitor and thus initialize the peak locator circuit when the rectified knock sensor signal voltage decreases below the threshold.

6. The ignition system of claim 1 in which the output circuit means comprises:
   means for generating a noise level signal related to noise in the knock burst envelope signal;
   means for comparing an amplitude of the knock burst envelope signal with the noise level signal to determine the difference therebetween;
   means for generating pulses at a frequency increasing with the difference; and
   means responsive to the frequency of the pulses for deriving ignition timing for the engine.

7. The ignition system of claim 6 in which:
   the means for comparing comprises a voltage divider connected between an output of the means for generating a noise level signal and a reference, the voltage divider having a plurality of output terminals with resistances therebetween to provide a plurality of ordered proportions of the difference between the noise level signal and the reference;
   the means for comparing further comprises a plurality of comparators, one input of each of the comparators being connected to each of the output terminals of the voltage divider and the other input of each of the terminals being connected to receive the knock burst envelope signal so that, as the knock burst envelope signal increases in amplitude, an increasing number of the comparators are activated; and the means for generating pulses is effective to generate pulses at a frequency which increases with the number of the comparators which are activated.

8. The ignition system of claim 7 in which the means for generating pulses is effective to generate synchronized pulses at a plurality of multiple frequencies and is responsive to each successive one of the comparators being activated to output pulses at the next higher one of the plurality of frequencies.

9. The ignition system of claim 8 in which each of the multiple frequencies is higher by a factor of two.

10. The ignition system of claim 6 in which:

the means for comparing comprises circuit means for deriving an analog voltage difference between the knock burst envelope signal and the noise level signal; and the means for generating pulses comprises a voltage controlled oscillator responsive to the analog voltage difference.

11. The ignition system of claim 6 in which the means for generating a noise level signal comprises:

a capacitor having a voltage thereon;

a first resistance and a second resistance much larger than the first resistance;

first circuit means comprising a series capacitor for generating an AC component of the knock burst envelope signal;

second circuit means for generating a noise ratiometric knock burst envelope signal by superimposing the AC component of the knock burst envelope signal on an average DC voltage level equal to the voltage on the capacitor;

third circuit means for generating a comparison voltage directly proportional to the voltage on the capacitor;

means for comparing the noise ratiometric knock burst envelope signal to the comparison voltage;

fourth circuit means responsive to the comparing means for charging the capacitor with the knock burst envelope signal through the first resistance when the comparison voltage exceeds the noise ratiometric knock burst envelope signal and through the second resistance when the noise ratiometric knock burst envelope signal exceeds the comparison voltage.

* * * * *